(12) United States Patent
Tyrer

(10) Patent No.: US 9,849,762 B2
(45) Date of Patent: Dec. 26, 2017

(54) GOLF CART ENCLOSURE HAVING DRAWSTRINGS

(71) Applicant: Stephen Tyrer, Deer Park, NY (US)

(72) Inventor: Stephen Tyrer, Deer Park, NY (US)

(73) Assignee: Stephen Tyrer, Deer Park, NY (US)

( * ) Notice: Subject to any disclaimer, the term of this patent is extended or adjusted under 35 U.S.C. 154(b) by 28 days.

(21) Appl. No.: 15/003,139

(22) Filed: Jan. 21, 2016

(65) Prior Publication Data

US 2016/0207383 A1    Jul. 21, 2016

Related U.S. Application Data

(60) Provisional application No. 62/105,956, filed on Jan. 21, 2015.

(51) Int. Cl.
*B60J 7/10*   (2006.01)

(52) U.S. Cl.
CPC ........................ *B60J 7/10* (2013.01)

(58) Field of Classification Search
CPC ....................................................... B60J 7/10
USPC ..................................................... 296/136.01
See application file for complete search history.

(56) References Cited

U.S. PATENT DOCUMENTS

| | | | | |
|---|---|---|---|---|
| 2,665,754 A * | 1/1954 | Claussen | ................ | B60J 1/2011 160/237 |
| 4,013,315 A * | 3/1977 | West | ........................ | B60J 11/00 280/DIG. 5 |
| 4,621,859 A * | 11/1986 | Spicher | .................. | B60J 5/0487 296/77.1 |
| 6,007,134 A * | 12/1999 | Weston | .................... | B60J 11/00 280/DIG. 5 |
| 6,439,637 B1 * | 8/2002 | Tyrer | ......................... | B60J 1/04 296/79 |
| 6,916,059 B2 * | 7/2005 | Feinberg | ..................... | B60J 5/00 296/145 |
| 9,276,381 B2 * | 3/2016 | Sugiyama | ............. | H01S 5/0285 |
| 2006/0202503 A1 * | 9/2006 | Tyrer | ....................... | B60J 7/085 296/100.14 |

* cited by examiner

*Primary Examiner* — Pinel E Romain

(74) *Attorney, Agent, or Firm* — Hoffmann & Baron, LLP

(57) ABSTRACT

A golf cart enclosure includes a roof panel, a rear panel, two side panels and a front panel to enclose an interior space of the golf cart. The front panel includes an opening adapted to surround a windshield of the golf cart. The front panel further includes a channel provided around a perimeter of the front panel opening for receiving at least one drawstring. Upon pulling the drawstring tight and locking in position, the edges of the front panel around the opening are drawn in toward a center of the opening to neatly and snuggly fit the enclosure to golf carts of varying dimensions.

14 Claims, 4 Drawing Sheets

GOLF CART ENCLOSURE HAVING DRAWSTRINGS

This Application claims priority to U.S. Provisional Application Ser. No. 62/105,956 filed on Jan. 21, 2015, the disclosure of which is incorporated herein in its entirety.

FIELD OF INVENTION

The invention relates to golf cart enclosures and more particularly to a universal enclosure including drawstrings to cinch the enclosure around the front end of the golf cart.

BACKGROUND

Flexible golf cart enclosures protect occupants of the cart from wind, rain, and cold temperatures. One type of a golf cart enclosure can be placed over the roof of the golf cart and includes a front, back and sides to enclose the passenger compartment. The sides include zippered doors to allow access into and out of the cart. The back encloses the rear portion of the cart and the front covers the windshield. The front, back and sides typically include a transparent window. The roof portion of the cart may have different dimensions depending upon the manufacturer. Furthermore, the front end of the golf cart and slope of the windshield also varies depending on manufacturer. Thus, it is difficult to make a universal enclosure which neatly and snuggly fits all golf carts, regardless of the manufacturer for the golf cart. Thus, there is a need for a golf cart enclosure which fits a variety of different makes and models of golf cart.

SUMMARY

A golf cart enclosure formed in accordance with the present invention includes a roof panel, a rear panel, two side panels and a front panel. The front panel includes an opening surrounding a windshield of a golf cart. The front panel further includes an edge seam or channel around the opening in which at least one drawstring is mounted. Upon pulling the at least one drawstring, the opening of the front panel surrounding the windshield tightens against the golf cart windshield frame to prevent gaps which could allow the elements to enter the interior space of the golf cart. In one embodiment, the golf cart enclosure includes at least two drawstrings. A first drawstring is adapted to tighten the enclosure around the golf cart windshield and a second drawstring is provided along a horizontal seam under a front end of the roof line to tighten the enclosure around the front end of the roof. Alternatively, the golf cart enclosure may include at least three drawstrings. A first drawstring is adapted to tighten the enclosure around a front end of the golf cart roof. A second drawstring is adapted to tighten at least a top, left side and right side of the front panel opening around the golf cart windshield. A third drawstring is provided on a bottom of the front panel opening and is adapted to tighten the enclosure around a lower portion of the windshield frame of the golf cart.

In a further embodiment, the golf cart enclosure includes at least four drawstrings. A first drawstring is adapted to tighten the enclosure around a front end of the golf cart roof. A second drawstring is adapted to tighten at least a top panel, left side panel and right side panel of the golf cart enclosure front panel around the golf cart windshield. A third drawstring is provided on a bottom of the front panel opening and is adapted to tighten the enclosure around a lower portion of the windshield frame of the golf cart. A fourth drawstring is provided along a bottom edge of the front panel which rests on a front cowl of the golf cart and is adapted to tighten the enclosure around the front cowl of the golf cart. The drawstrings preferably include a lock to hold the cinched drawstrings tightly in place. The lock may be a spring-loaded cord lock.

The present invention includes a unique front panel for a four-sided golf cart enclosure. A front panel of a golf cart enclosure includes an opening adapted to surround a windshield on a golf cart. The front panel further includes a channel provided around a perimeter of the front panel opening for receiving at least one drawstring, wherein upon cinching the drawstring, edges of the front panel around the opening are drawn in toward a center of the opening. Thus, the at least one drawstring allows the front panel to be tightened around a golf cart windshield.

In a further embodiment, a front panel of a golf cart enclosure includes at least two drawstrings. A first drawstring surrounds the opening in the front panel and is adapted to tighten the enclosure around the golf cart windshield. A second drawstring is provided along a horizontal seam under a front end of the roof line and is adapted to tighten the enclosure around the front end of the roof. Alternatively, a front panel of a golf cart enclosure includes at least two drawstrings. A first drawstring surrounds the opening in the front panel and is adapted to tighten the enclosure around the golf cart windshield. A second drawstring is provided along a bottom edge of the front panel which rests on a front cowl of a golf cart and is adapted to tighten the enclosure around the front cowl of the golf cart. Thus, the present invention solves the problem of neatly fitting the golf cart enclosure having an opening in a front panel thereof to a variety of different golf carts, regardless of the size of the roof or the angle of the windshield frame.

These and other features and advantages of the invention will become more apparent from the following detailed description taken in conjunction with the accompanying drawings.

DESCRIPTION OF THE DRAWINGS

The invention will be better understood by referring to the description which follows with reference to the drawings, which illustrate by way of non-limiting examples, embodiments of the invention, with like reference numbers representing similar parts throughout the several views, and wherein.

DETAILED DESCRIPTION

Nearly all golf carts manufactured today include a windshield. Thus, it is not necessary to include a transparent front window on the golf cart enclosure to protect the occupants from the elements. However, without a front window, the golf cart enclosure when mounted on the cart will create gaps at the top, bottom and sides of the opening which allow unwanted inclement weather and air into the passenger compartment. There are no supporting structures on the front of the golf cart to hold the enclosure in the area of the opening for the front windshield.

Figure 1:
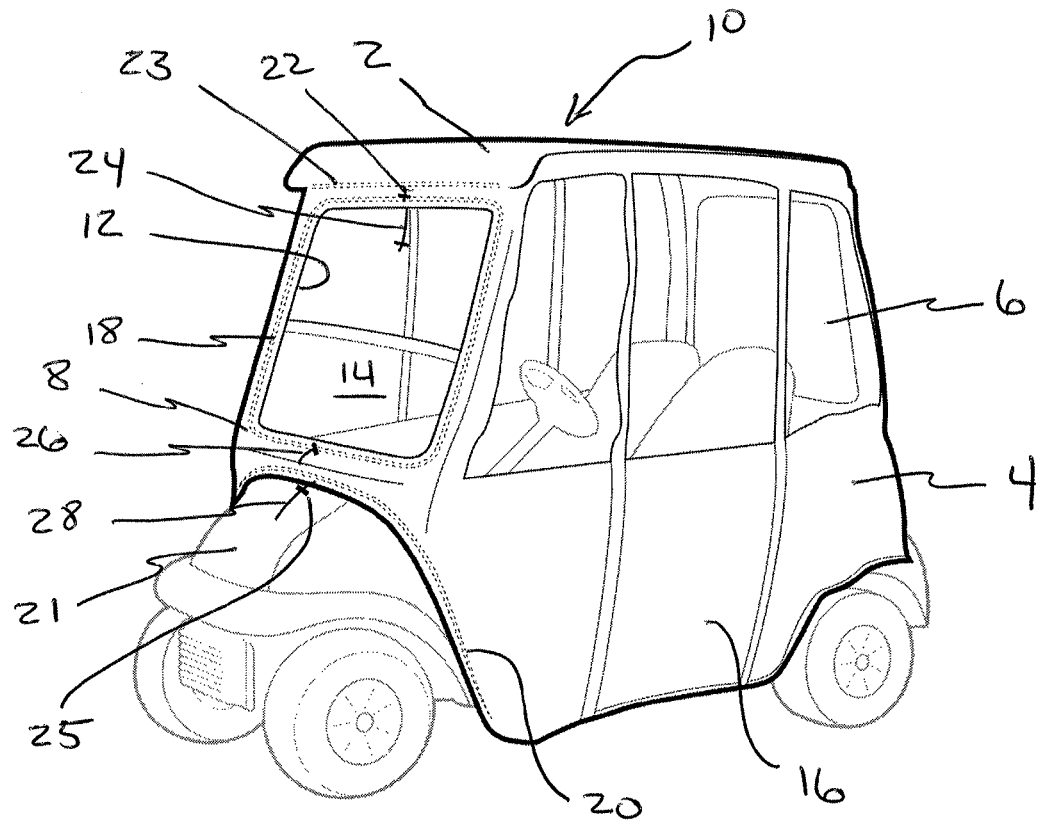
FIG. 1 is a perspective view of the golf cart enclosure formed in accordance with the present invention showing the drawstrings in a loosened state.
Figure 2:
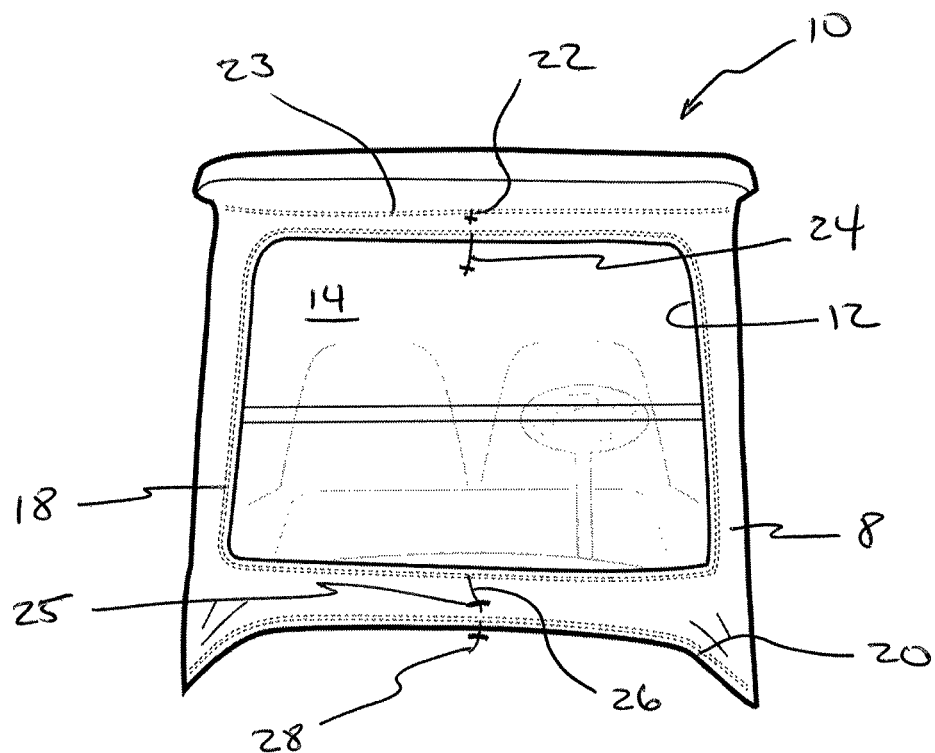
FIG. 2 is a front view of the golf cart enclosure as shown in FIG. 1.
Figure 3:
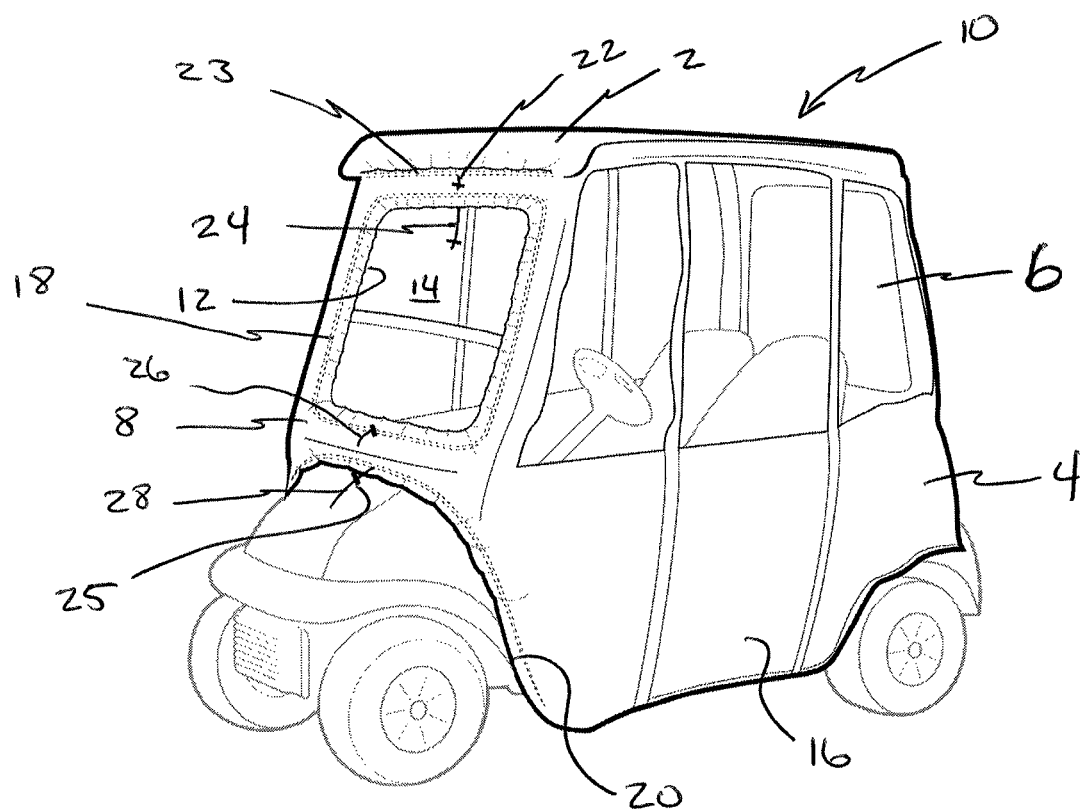
FIG. 3 is a perspective view of the golf cart enclosure formed in accordance with the present invention having the drawstrings cinched to illustrate that the front panel fits snuggly against the roof, windshield and front cowl of the golf cart.
Figure 4:
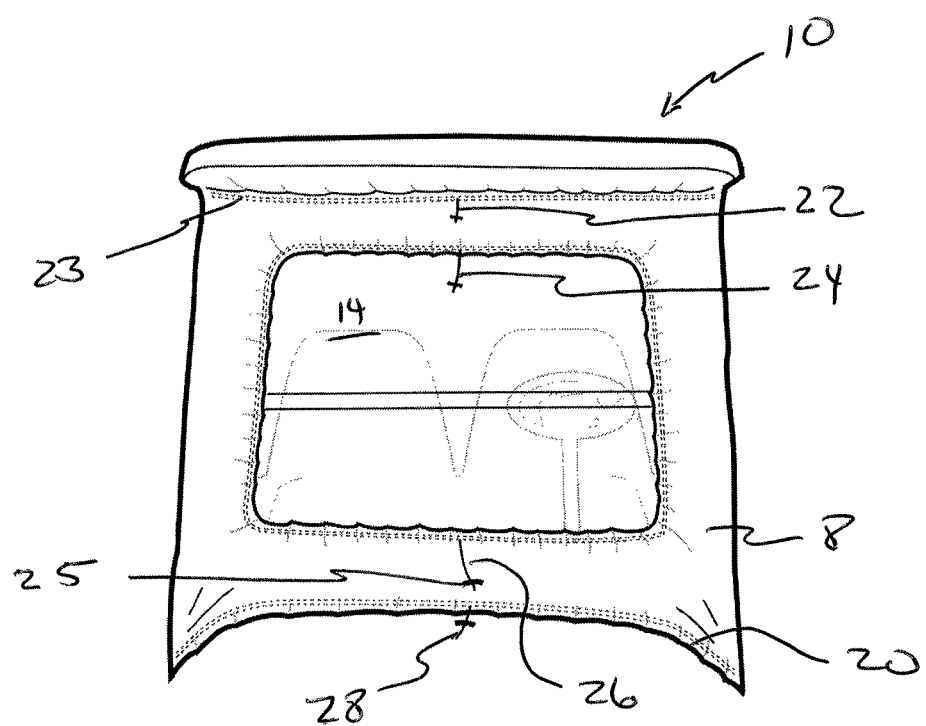
FIG. 4 is a front view of the golf cart enclosure shown in FIG. 3.

The present invention provides an enclosure having a front panel which includes an opening surrounding the windshield and solves the problem of fitting a variety of golf carts. The present invention provides a four-sided golf cart enclosure which can be mounted on a variety of different golf carts having varying dimensions for the roof, front cowl and windshield. As shown in FIGS. 1-4, to overcome the problem of gaps around the windshield opening and differently sized golf carts, the present invention uses a plurality of drawstrings sewn into the front panel of the enclosure. More specifically, FIG. 1 illustrates the golf cart enclosure 10 formed in accordance with the present invention which includes a top 2, sides 4, back 6 and front panel 8 having an opening 12 surrounding the golf cart windshield 14. Preferably, the sides 4 include a zippered opening 16 to allow ingress and egress from the golf cart interior. As shown in FIG. 1, the golf cart enclosure entirely closes the interior space from the weather. The front panel opening 12 is illustrated as being substantially rectangular to conform to the shape of the golf cart windshield 14. The front panel 18 preferably includes a plurality of drawstrings which may be tightened or cinched to pull the enclosure of the present invention tightly against the golf cart roof, windshield frame and front cowl. In FIG. 1, the drawstrings are shown in the loosened position.

The drawstrings are preferably sewn into an edge seam or other channel 18 along the four sides of the windshield opening 12 as well as along a bottom edge 20 of the front panel adjacent to the golf cart front cowl 21 and a seam 23 under the roof for another drawstring 22. Preferably, the enclosure includes at least four drawstrings, but may include more or less depending upon the design. A first drawstring 22 is provided along a horizontal seam 23 under the front end of the roof line. Cinching or pulling the first drawstring 22 tight secures the front of the enclosure snuggly around the front end of the roof regardless of any differences in size among different manufacturers. Preferably, the first drawstring includes a pair of strings which come together at a midpoint of the roof as shown in FIG. 1. Each drawstring is anchored at a distal end from the midpoint so that pulling on the drawstring pulls the enclosure snuggly around the front end of the roof. It should be noted that each drawstring is preferably anchored at its distal end so that upon tightening, the enclosure is drawn close to and fitted around the golf cart. Furthermore, a single one-piece drawstring may be used for any of the drawstrings discussed herein to pull the enclosure around the golf cart. By way of example only, the first drawstring 22 may be fixed to the enclosure at the top edge on the driver's side and may exit the enclosure at the opposite passenger's side top edge for easier access to the user. Pulling the string tight still accomplishes the same function, i.e., tightly holding the enclosure to the front end of the roof.

A second drawstring 24 is preferably provided along the top and sides of the windshield opening 12. The second 24 drawstring is preferably provided at a midpoint along the top of the opening. When the second drawstring 24 is cinched, the top and sides of the enclosure are drawn in toward a center of the front panel opening and snuggly engage the windshield and windshield frame. A spring-loaded cord lock 25 is preferably provided to lock the drawstring in the cinched position. The ends of the second drawstring are preferably anchored to the lower end of each side of the windshield opening 12.

A third drawstring 26 is preferably provided at a midpoint along the bottom edge of the opening 12. When the third drawstring 26 is cinched, the bottom edge of the opening 12 is drawn tightly against the windshield and windshield frame. When tightened, any gaps between the opening and the windshield are closed to prevent unwanted weather such as wind, rain or cold air from entering the passenger compartment.

Preferably, at least a fourth drawstring 28 is provided along a lower portion or bottom edge 20 of the front panel 8 of the enclosure which rests on the golf cart front cowl 21. This drawstring 28, when tightened, pulls the bottom edge 20 of the front panel of the enclosure tightly around the lower portion of the windshield frame and front cowl to close any gaps. As noted above, the golf cart enclosure of the present invention may include any number of drawstrings. For example, a first drawstring may be provided to hold the enclosure closely to the roof, a second drawstring may be used to cinch the enclosure along a top portion of the windshield frame, a third and fourth drawstring may be provided on each side of the front panel and a fifth drawstring may be provided along a bottom of the front panel. Thus, when all the drawstrings are cinched tight, the front panel of the enclosure is closely fitted to the golf cart roof, windshield frame and front cowl to prevent weather and wind intrusion. Alternatively, the opening 12 in the front panel may include a single, non-anchored drawstring surrounding the entire opening so that only one drawstring needs to be cinched to pull the front panel tightly against the windshield and windshield frame.

As previously mentioned, the drawstrings may be held in place upon cinching using well known spring-loaded cord locks 25 commonly used on backpacks, hoods, etc. with no tying required. It is envisioned that any known cord lock may be used to hold the drawstring tightly cinched. Alternatively, the drawstrings may simply be tied without the need for a cord lock. Accordingly, the golf cart enclosure of the present invention is easy to use and install and fits a wide range of golf cart types yet still provides a custom fit. Thus, the user may take the golf cart enclosure from golf course to golf course and be confident that the enclosure will fit the golf cart, regardless of the make or model. Furthermore, by providing an opening around the windshield rather than a translucent panel which can wrinkle or become opaque over time, the operator has improved visibility using the enclosure formed in accordance with the present invention.

It will be understood by those of ordinary skill in the art that variations to and modification of the above-described invention may be made without departing from the inventive concepts disclosed herein. Accordingly, the invention should not be viewed as limited except by the scope and spirit of the appended claims.

What is claimed is:

1. A golf cart enclosure having a roof panel, a rear panel, two side panels and a front panel, wherein the front panel includes an opening adapted to surround a windshield of a golf cart, the front panel further including an edge seam or channel around the opening in which at least one drawstring is mounted, wherein pulling the at least one drawstring draws edges of the opening in towards a center of the opening.

2. A golf cart enclosure as defined in claim 1, further comprising at least two drawstrings, a first drawstring surrounding the opening in the front panel and adapted to tighten the enclosure around the golf cart windshield and a second drawstring provided along a horizontal seam under a front end of the roof line adapted to tighten the enclosure around the front end of the roof.

3. A golf cart enclosure as defined in claim 1, further comprising at least three drawstrings, a first drawstring adapted to tighten the enclosure around a front end of the golf cart roof, a second drawstring adapted to tighten at least a top, left side and right side of the front panel opening around the golf cart windshield, and a third drawstring provided on a bottom of the front panel opening adapted to tighten the enclosure around a lower portion of the windshield of the golf cart.

4. A golf cart enclosure as defined in claim 1, further comprising at least four drawstrings, a first drawstring adapted to tighten the enclosure around a front end of the golf cart roof, a second drawstring adapted to tighten at least a top, left side and right side of the front panel opening around the golf cart windshield, a third drawstring provided on a bottom of the front panel opening adapted to tighten the enclosure around a lower portion of the windshield frame of the golf cart; and a fourth drawstring provided along a bottom edge of the front panel which rests on a front cowl of the golf cart adapted to tighten the enclosure around the front cowl of the golf cart.

5. A golf cart enclosure as defined in claim 1, further comprising at least two drawstrings, a first drawstring surrounding the opening in the front panel and adapted to tighten the enclosure around the golf cart windshield, and a second drawstring provided along a bottom edge of the front panel which rests on a front cowl of a golf cart and adapted to tighten the enclosure around the front cowl of the golf cart.

6. A golf cart enclosure as defined in claim 1, wherein the at least one drawstring includes a lock to hold the drawstring tightly in place.

7. A golf cart enclosure as defined in claim 6, wherein the lock is a spring-loaded cord lock.

8. A front panel of a golf cart enclosure, the front panel including an opening adapted to surround a windshield on a golf cart, the front panel further comprising a channel provided around a perimeter of the front panel opening for receiving at least one drawstring, wherein upon cinching the at least one drawstring, edges of the front panel around the opening are drawn in toward a center of the opening.

9. A front panel of a golf cart enclosure as defined in claim 8, further comprising at least two drawstrings, a first drawstring surrounding the opening in the front panel and adapted to tighten the enclosure around the golf cart windshield and a second drawstring provided along a horizontal seam under a front end of the roof line adapted to tighten the enclosure around the front end of the roof.

10. A front panel of a golf cart enclosure as defined in claim 8, further comprising at least two drawstrings, a first drawstring surround the opening in the front panel and adapted to tighten the enclosure around the golf cart windshield, and a second drawstring provided along a bottom edge of the front panel which rests on a front cowl of a golf cart and adapted to tighten the enclosure around the front cowl of the golf cart.

11. A front panel of a golf cart enclosure as defined in claim 8, wherein the at least one drawstring includes a lock to hold the drawstring tightly in place.

12. A front panel of a golf cart enclosure as defined in claim 8, wherein the lock is a spring-loaded cord lock.

13. A golf cart enclosure having a roof panel, a rear panel, two side panels and a front panel, wherein the front panel includes an opening adapted to surround a windshield of a golf cart, the front panel further including an edge seam or channel around the opening in which at least one drawstring is mounted, wherein pulling the at least one drawstring draws edges of the opening in towards a center of the opening; and wherein a first drawstring surrounding the opening in the front panel is adapted to tighten the enclosure around the golf cart windshield and a second drawstring is provided along a horizontal seam under a front end of the roof line which is adapted to tighten the enclosure around the front end of the roof.

14. A golf cart enclosure having a roof panel, a rear panel, two side panels and a front panel, wherein the front panel includes an opening adapted to surround a windshield of a golf cart, the front panel further including an edge seam or channel around the opening in which at least one drawstring is mounted, wherein pulling the at least one drawstring draws edges of the opening in towards a center of the opening, and wherein the at least one drawstring includes a lock to hold the drawstring tightly in place.

* * * * *